(12) United States Patent
Kundaje et al.

(10) Patent No.: US 8,982,876 B2
(45) Date of Patent: *Mar. 17, 2015

(54) METHOD AND SYSTEM FOR CUSTOMER SELECTED DIRECT DIALED VOICE-OVER-INTERNET PROTOCOL (VOIP)

(71) Applicant: AT&T Intellectual Property II, L.P., Atlanta, GA (US)

(72) Inventors: Vinay Kundaje, Succasunna, NJ (US); Scott R. Lytle, Blairstown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/893,148

(22) Filed: May 13, 2013

(65) Prior Publication Data

US 2013/0242982 A1 Sep. 19, 2013

Related U.S. Application Data

(63) Continuation of application No. 11/240,219, filed on Sep. 29, 2005, now Pat. No. 8,442,032, which is a continuation of application No. 09/599,947, filed on Jun. 23, 2000, now Pat. No. 7,046,658.

(51) Int. Cl.
*H04L 12/28* (2006.01)
*H04M 15/00* (2006.01)
*H04M 7/12* (2006.01)

(52) U.S. Cl.
CPC ............ *H04M 15/56* (2013.01); *H04M 7/1245* (2013.01)
USPC ........................................................ 370/352

(58) Field of Classification Search
None
See application file for complete search history.

(56) References Cited

U.S. PATENT DOCUMENTS

| 4,100,377 A | 7/1978 | Flanagan |
| 4,771,425 A | 9/1988 | Baran et al. |
| 4,903,261 A | 2/1990 | Baran et al. |
| 4,969,184 A | 11/1990 | Gordon et al. |

(Continued)

FOREIGN PATENT DOCUMENTS

WO WO-9201350 1/1992

OTHER PUBLICATIONS

Culver, Denise, "Rockwell Snags Patent on Web Call Option" Interactive Week, Mar. 10, 2000.

(Continued)

*Primary Examiner* — John Blanton

(57) ABSTRACT

A Voice-over-Internet protocol (VOIP) communications network system that enables direct-dialed (single-stage) access to the Internet Protocol network from the circuit-switched network. Specifically, the VOIP network system includes a VOIP service implemented on a communications system which, after a customer number has been registered for the service, automatically recognizes calls from the registered customer's telephone number and determines if the call can be routed as a VOIP call over the IP network. In embodiments of the present invention, the customer can register for the VOIP service by selecting both a provider and a calling plan or by only selecting a provider. The system can be implemented to handle intra-state, inter-state and international voice-band calls (for example, regular telephone calls, facsimile transmissions and modem initiated calls) using standard circuit-switched telephone lines, cable, twisted pair, digital subscriber line and wireless.

19 Claims, 7 Drawing Sheets

(56) References Cited

U.S. PATENT DOCUMENTS

| | | |
|---|---|---|
| 5,008,878 A | 4/1991 | Ahmadi et al. |
| 5,014,266 A | 5/1991 | Bales et al. |
| 5,036,535 A | 7/1991 | Gechter et al. |
| 5,353,283 A | 10/1994 | Tsuchiya |
| 5,394,463 A | 2/1995 | Fischell et al. |
| 5,406,557 A | 4/1995 | Baudoin |
| 5,469,500 A | 11/1995 | Sater et al. |
| 5,471,470 A | 11/1995 | Sharma et al. |
| 5,521,924 A | 5/1996 | Kakuma et al. |
| 5,526,353 A | 6/1996 | Henley et al. |
| 5,530,724 A | 6/1996 | Abrams et al. |
| 5,541,930 A | 7/1996 | Klingman |
| 5,608,786 A | 3/1997 | Gordon |
| 5,633,919 A | 5/1997 | Hogan et al. |
| 5,881,132 A | 3/1999 | O'Brien et al. |
| 5,918,019 A | 6/1999 | Valencia |
| 5,940,479 A | 8/1999 | Guy et al. |
| 5,983,282 A | 11/1999 | Yucebay |
| 6,005,926 A | 12/1999 | Mashinsky |
| 6,018,575 A | 1/2000 | Gross et al. |
| 6,031,575 A | 2/2000 | Suzuki et al. |
| 6,046,980 A | 4/2000 | Packer |
| 6,061,347 A | 5/2000 | Hollatz et al. |
| 6,081,518 A | 6/2000 | Bowman-Amuah |
| 6,215,858 B1 | 4/2001 | Bartholomew et al. |
| 6,233,234 B1 | 5/2001 | Curry et al. |
| 6,292,478 B1 | 9/2001 | Farris |
| 6,668,046 B1 | 12/2003 | Albal |
| 6,690,675 B1 | 2/2004 | Kung et al. |
| 6,731,630 B1 | 5/2004 | Schuster et al. |
| 6,914,897 B1 | 7/2005 | Schuster |
| 7,046,658 B1 | 5/2006 | Kundaje et al. |
| 7,123,608 B1 | 10/2006 | Scott et al. |
| 2003/0185375 A1 | 10/2003 | Albal |
| 2005/0157861 A1 | 7/2005 | Bossemeyer et al. |
| 2008/0025295 A1 | 1/2008 | Elliott et al. |

OTHER PUBLICATIONS

Rockwell Electronic Commerce, "Rockwell Electronic Commerce Receives for Popular Web Callback Application" Feb. 17, 2000.

Taschek, John, "Wide Angle IP Telephony/VOIP is a work in progress" ZDNET, eWeek, Feb. 7, 2000.

Smetannikov, Max, "Ibasis Moves to Metered Billing with Narus" Interactive Week, May 22, 2000.

Culver, Denise, "IP Service Billing : They Say It Can Be Done" Interactive Week, May 17, 2000.

Berst, Jesse, "Voice Over Internet Remains Elusive" ZDNET AnchorDesk.

AT&T, "Connect and Save".

GTE Showcase, "VoIP".

Vinodkrishnan Kulathumani, "Voice over IP: Products, Services and Issues".

Rakesh, Arora, "Voice over IP: Protocols and Standards".

Gifford, James, "IP Telephony: Enterprise-Class VOIP Gateways".

Jain, Raj, "Voice over IP".

METHOD AND SYSTEM FOR CUSTOMER SELECTED DIRECT DIALED VOICE-OVER-INTERNET PROTOCOL (VOIP)

CROSS-REFERENCE TO RELATED APPLICATIONS

This application is a continuation of U.S. patent application Ser. No. 11/240,219, filed Sep. 29, 2005, which is currently allowed and is a continuation of U.S. patent application Ser. No. 09/599,947, filed Jun. 23, 2000, now U.S. Pat. No. 7,046,658, both of which are herein incorporated by referenced in their entirety.

TECHNICAL FIELD

The present invention relates generally to Voice-over-Internet protocol (VOIP) systems, and more particularly to direct-dialed, that is, "single-stage" VOIP systems.

BACKGROUND OF THE INVENTION

Voice-over-Internet protocol (VOIP) telephony systems deal with the transmission of voice-band calls over a packet data network, such as a corporate intranet or the Internet. Using current VOIP systems to make long distance calls offers a number of interesting advantages when compared to traditional long distance telephone service. Some of these advantages include, for example, the ability to place long distance calls as two local voice band calls using an IP data link between them, one local call at the calling number end and one at the destination number end; and being able to manage a voice and data network as a single network. Likewise, additional advantages include moving, adding and changing Internet Protocol (IP) phones is easier and cheaper than regular telephones; providing new and integrated services including integrated messaging, bandwidth on demand, voice e-mails, "voice portals" that provide interactive voice response access to systems such as the Internet; and simplified setting up, tearing down and transferring of phone calls.

Unfortunately, current VOIP systems have some significant disadvantages as well, including no single-stage dialing as on a circuit-switched Public Switched Telephone Network (PSTN); only two- or three-stage dialing capabilities; and no integrated billing system that can detect and track network use and associate the use with a number for billing purposes. "Single-stage" dialing, which is also known as direct-dialing, permits a caller to dial the desired destination number, the telephone network automatically recognizes the telephone number from which the caller initiated the call, the telephone network automatically determines which calling plan(s) the caller has been registered and routes the call based on the caller's calling plan(s).

"Two-stage" or "three-stage" dialing both require the caller to first call an IP network access number, which can be either a local or a national number, and either a toll-free or a toll number. Next, for two-stage dialing, the system at the access number either automatically detects and recognizes the caller's number or the caller's phone service is programmed to automatically send the caller's account number and PIN when the caller dials the access number; the system then connects the caller to the system and the caller enters the desired destination number. Alternatively, for three-stage dialing, after the system at the access number answers, the caller is usually prompted to enter the caller's account number and PIN and, then, the caller enters the desired destination number.

An example of both a two-stage and a three-stage dialing, prepaid VOIP calling plan is AT&T's Connect 'N Save® service. In this two-stage dialing service, the customer enrolls in the service, prepays a set amount using a credit/debit card or a check, and signs up for the Express Login feature at the customer's registered telephone number. The Express Login feature only operates from the customer's telephone number and automatically identifies the customer's account number and PIN when the customer calls the access number from the customer's registered telephone number. After connecting to the service, the customer dials the desired destination number and waits for the call to connect with the destination number. The Connect 'N Save® service has both local and national access numbers that can be used to access the service. An example of three-stage dialing occurs in the Connect 'N Save® service if the customer either did not sign up for the Express Login feature or is calling an access number from a telephone number other than the one that was used to sign up for the Connect 'N Save® service. In this case, the customer first dials the access number; second, enters the customer's account number and PIN; and third, dials the desired destination number.

FIG. 1, depicts a block diagram implementation of current two-stage and three-stage voice-over-Internet protocol (VOIP) services. In FIG. 1, customer (calling party) telephones 115 and 116 are connected to a local access provider network 118, which is in turn connected to a circuit-switched, Public Switched Telephone Network (PSTN) 145 and to an IP gateway 120, which is communicatively linked to an IP Network 110. The IP gateway 120 provides both local and toll free number VOIP access to the IP Network 110, however, single telephones are shown accessing the IP gateway 120 for each of the local and toll free VOIP access numbers in FIG. 2 for reasons of clarity. The IP Network 110 is communicatively linked with another IP gateway 125, which provides VOIP service to U.S. locations, and the IP gateway 125 is communicatively linked to a destination telephone 135 through a destination local access provider network (not shown). Similarly, the IP Network 110 is communicatively linked with another IP gateway 130, which provides VOIP service to international locations, and the IP gateway 130 is communicatively linked to a destination telephone 136 through another destination local access provider network (not shown). The IP Network 110 is communicatively linked with another IP gateway 140, which is communicatively linked to a second circuit-switched PSTN 145. When a calling party places a call to a destination telephone number that is not served by any of the VOIP service IP gateways 125 and 130, the call is routed through the IP gateway 140 to the second PSTN 145 for completion as a circuit-switched telephone call.

In FIG. 1, when a caller desires to place a VOIP call the caller first calls one of the access numbers at the IP gateway 120 from one of the telephones 115 and 116. These access numbers can be either a local or a national numbers, and either a toll-free or a toll number. Next, for two-stage dialing, the system at the IP gateway 120 either automatically detects and recognizes the caller's number or the caller's phone service can be programmed to automatically send the caller's account number and PIN when the caller dials the access number, connects the caller to the system and the caller enters the desired destination number. Alternatively, for three-stage dialing, after the system at the IP gateway 120 answers, the caller is usually prompted to enter the caller's account number and PIN or credit/calling/debit card number and PIN and, then, the caller enters the desired destination telephone number. Upon receiving the destination telephone number, the IP gateway 120 determines an appropriate destination IP gateway, for example, destination IP gateway 125, converts the call into packets and then routes the packets to the destination IP gateway 125 through the IP Network 110. The IP network 110 is configured to receive the packets and then route the packets to the destination IP gateway 125 through the destination local access provider network (not shown). The destination IP gateway 125 receives the packets, reassembles the packets, converts the packets back to a voice-band call and sends the reassembled voice-band call to the destination telephone number 135 through the other destination local access provider network (not shown).

Unfortunately, the currently-available two-stage and three-stage VOIP services require the entry of multiple phone, account and PIN numbers to use the service, which is inefficient and unpleasant for customers. Another disadvantage of some currently-available two- and three-stage VOIP services is that they require either the purchase of new prepaid calling cards or the replenishment of minimum prepaid account balances because the calling party's regular telephone service billing system is not connected to and does not communicate with the VOIP service.

Accordingly, a single-stage VOIP system is desired that enables the user to directly dial a destination number from a telephone attached to the circuit-switched PSTN, where the call is automatically routed as a VOIP call over the IP network and billed to the calling party's regular telephone-bill account. Likewise, a provisioning system is desired that receives customer orders for the VOIP service, provisions the network and billing systems based on the orders and maintains the operational and informational synchronization between the network and billing systems.

SUMMARY OF THE INVENTION

The present invention is directed to a single-stage VOIP system that enables the user to directly dial a destination number from a telephone attached to the circuit-switched PSTN and have the call automatically routed as a VOIP call over the IP network and billed to the calling party's regular telephone-bill account.

In an embodiment of the present invention, a method for routing direct-dialed voice-band calls over an IP network includes receiving a direct-dialed voice-band call from a calling party telephone number, the direct-dialed voice-band call being associated with a destination number. The method further includes automatically routing the direct-dialed voice-band call to the destination number as a VOIP telephone call if the calling party telephone number is registered for a VOIP service and if the destination number of the direct-dialed telephone call is accessible by the VOIP service.

In an embodiment of the present invention, a method for automatically provisioning and maintaining a network system for routing direct-dialed voice-band calls from a calling party telephone number over an IP network includes receiving a VOIP service registration for the calling party telephone number, generating at least one order record for the calling party telephone number's VOIP service and storing the at least one order record for the calling party telephone number's VOIP service. The method further includes managing the billing interaction for a billed account between at least one calling party telephone number and a billed telephone number; synchronizing changes made to the stored at least one order record for the calling party telephone number's VOIP service, between the network system and a billing system, due to calling party activations, disconnections and changes; and processing at least one call detail record including at least a terminating access identification (ID).

In an embodiment of the present invention, an apparatus includes a first voice-band switch and a database coupled to the first voice-band switch. In the apparatus, the first voice-band switch is configured to receive a direct-dialed voice-band call from a calling party's telephone number and to automatically designate the direct-dialed voice-band call as a VOIP call.

DETAILED DESCRIPTION

A direct-dialed voice-over-Internet protocol (VOIP) service is provided to registered customers so that the VOIP service is transparent to the customers when it is in operation. In accordance with an embodiment of the present invention, a customer registers (signs-up) for the VOIP service (calling plan) and, once a customer registers for the service, then all of the customer's voice-band calls can be automatically routed through the VOIP service just as with other standard circuit-switched calling plans. Note that the registration of customers for the VOIP service is not required by embodiments of the present invention because the VOIP service could be offered as the standard service that customers would have to opt out of, that is, choose not to use, by registering for an alternate calling plan.

Figure 2:
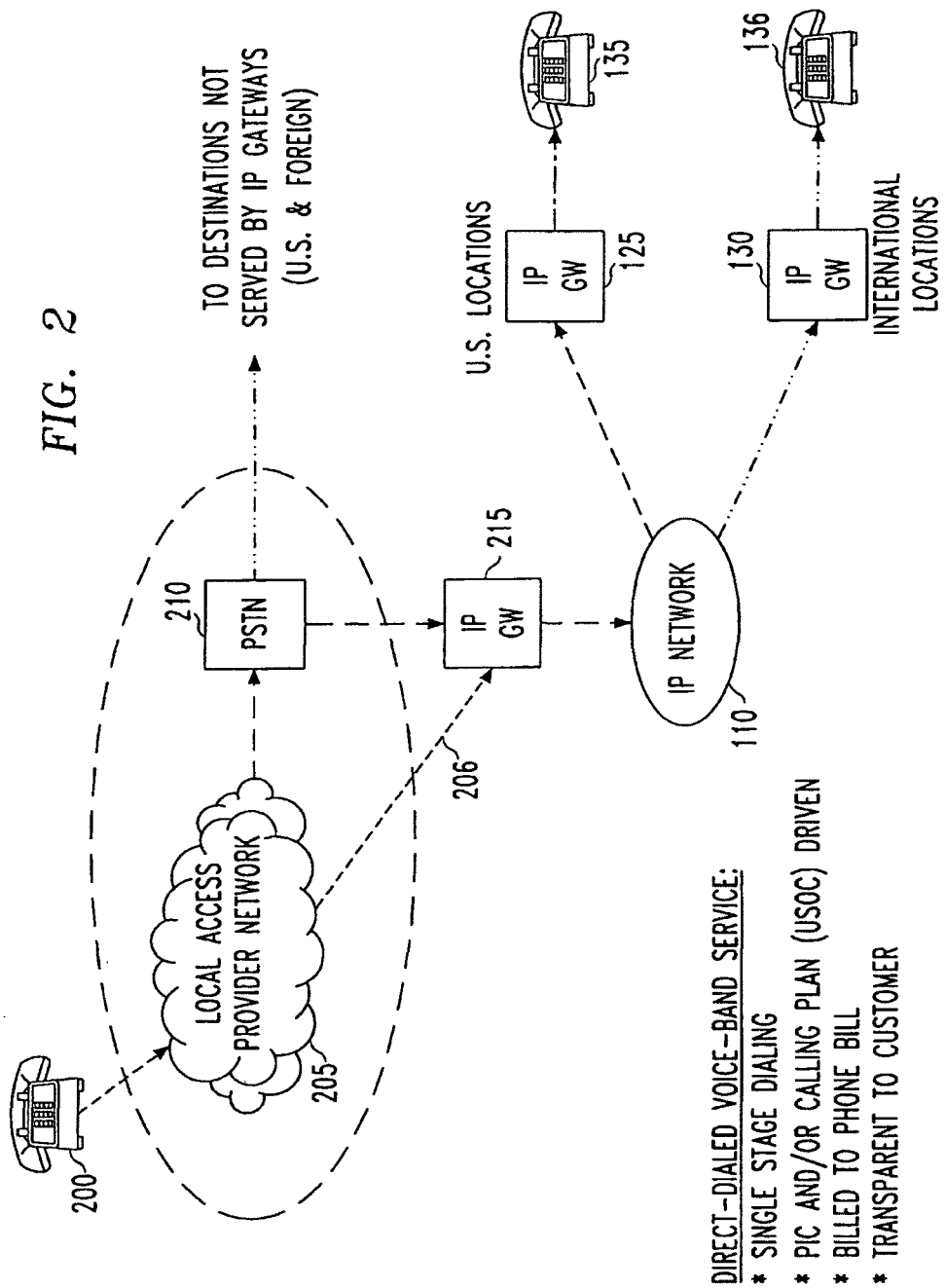
FIG. 2 is a block diagram of the direct-dialed VOIP system according to an embodiment to the present invention.

FIG. 2 is a block diagram of the direct-dialed VOIP system according to an embodiment to the present invention. In FIG. 2, a customer telephone 200 is connected to an originating local-access-provider network 205 and assigned a telephone number (not shown), which is stored at the originating local-access-provider network 205. More generally, the originating local-access-provider network 205 may provide local voice-band telecommunications services for numerous telephone numbers, however, only a single telephone 200, which is associated with a single telephone number, is illustrated in FIG. 2 for reasons of clarity. An alternate embodiment of the present invention is contemplated in which multiple telephones, each associated with a unique telephone number, are connected to and registered for the VOIP service. In another embodiment of the present invention, multiple telephones can be associated with the single telephone number registered for the VOIP service, for example, the multiple telephones can be extension phones that are all proximally located so that they can be connected to a single telephone line, which provides service for the single telephone number. The originating local-access-provider network 205 may be communicatively linked with a circuit-switched, PSTN 210 when a calling party places a call to one of destination telephones 135, 136. The destination telephones can be located both within and outside the service area of the originating local-access-provider network 205. For example, calls outside the local service area can include an intra-state long distance call, an out-of-state long distance call or an international long distance call.

The PSTN 210 is capable of providing service for numerous different calling plans and millions of different customers. In accordance with embodiments of the present invention, the PSTN 210 generally includes a long distance telephone provider network, a local telephone service provider and a Private Branch eXchange (PBX). PSTN 210 is communicatively linked with an IP gateway 215, and the IP gateway 215 is communicatively linked with the IP network 110. The PSTN 210 also is communicatively linked with other US and foreign destinations that are not served by IP gateways. The IP network 110 is communicatively linked with an IP gateway 125 for US locations served by this IP gateway, and the IP network 110 is also is communicatively linked with an IP gateway 130 for foreign locations served by this IP gateway. Note that while FIG. 2 and the above detail only show and describe single components for the sake of clarity, each component can be representative of multiple components. For example, multiple telephones (for example, telephone 200) each can be communicatively linked to the local-access-provider network 205. Likewise, multiple originating local-access-provider networks 205 can each be communicatively linked to the PSTN 210 of FIG. 2, or each of a plurality of originating local-access-provider networks 205 can each be communicatively linked to a separate PSTN 210. Similar multiple configurations of the IP gateways 215, 125 and 130, the IP network 110 and destination telephones 135 and 136 are also contemplated in embodiments of the present invention.

In FIG. 2, in accordance with an embodiment of the present invention, a caller places a direct-dialed long-distance call from the telephone 200, that is, for example, the caller dials 1-555-123-4567. The call is received by the originating local-access-provider network 205 and then routed to the PSTN 210, because the "1-" dialing prefix identifies the call as a long-distance call. After receiving the direct-dialed long-distance call, the PSTN 210 determines if the call (or a portion thereof) can be routed as a VOIP call over the IP network 110. The call can be routed as a VOIP call over the IP network 110 if the caller's number is registered for the VOIP service and the destination number is served by the IP network. If the call can be routed as a VOIP call, the PSTN 210 initiates a VOIP billing record to track the duration and cost of the VOIP call and, then, the PSTN 210 routes the call to an IP gateway 215. Once the IP gateway 215 has received the call, the IP gateway 215 determines a specific destination IP gateway 125 or 130 based on the destination number, for example, IP gateway 125; converts the voice-band call setup information to packets, and then routes the packets to the destination IP gateway 125 through the IP network 110. IP network 110 is configured to receive the packets and then route the packets to the destination IP gateway 125. Destination IP gateway 125 receives the packets, reassembles the packets, converts the packets back to a voice-band call and sends the reassembled voice-band call to the destination number 135 through a destination local access network provider (not shown).

In an alternate embodiment of the present invention, an originating local-access-provider network can be configured to communicate directly with an IP gateway and perform the same functions as described above for the PSTN 210. Similarly, in another embodiment, an originating local-access-provider network 205 can be configured to communicate directly with an IP gateway 215 for calls within the service area of the originating local-access-provider network 205 (communication link 206).

In another embodiment of the present invention, an originating local-access-provider network can be a corporate telephone network or Private Branch eXchange (PBX) which is configured to communicate directly with an IP gateway and an IP network, which is a local area network (LAN).

Figure 1:
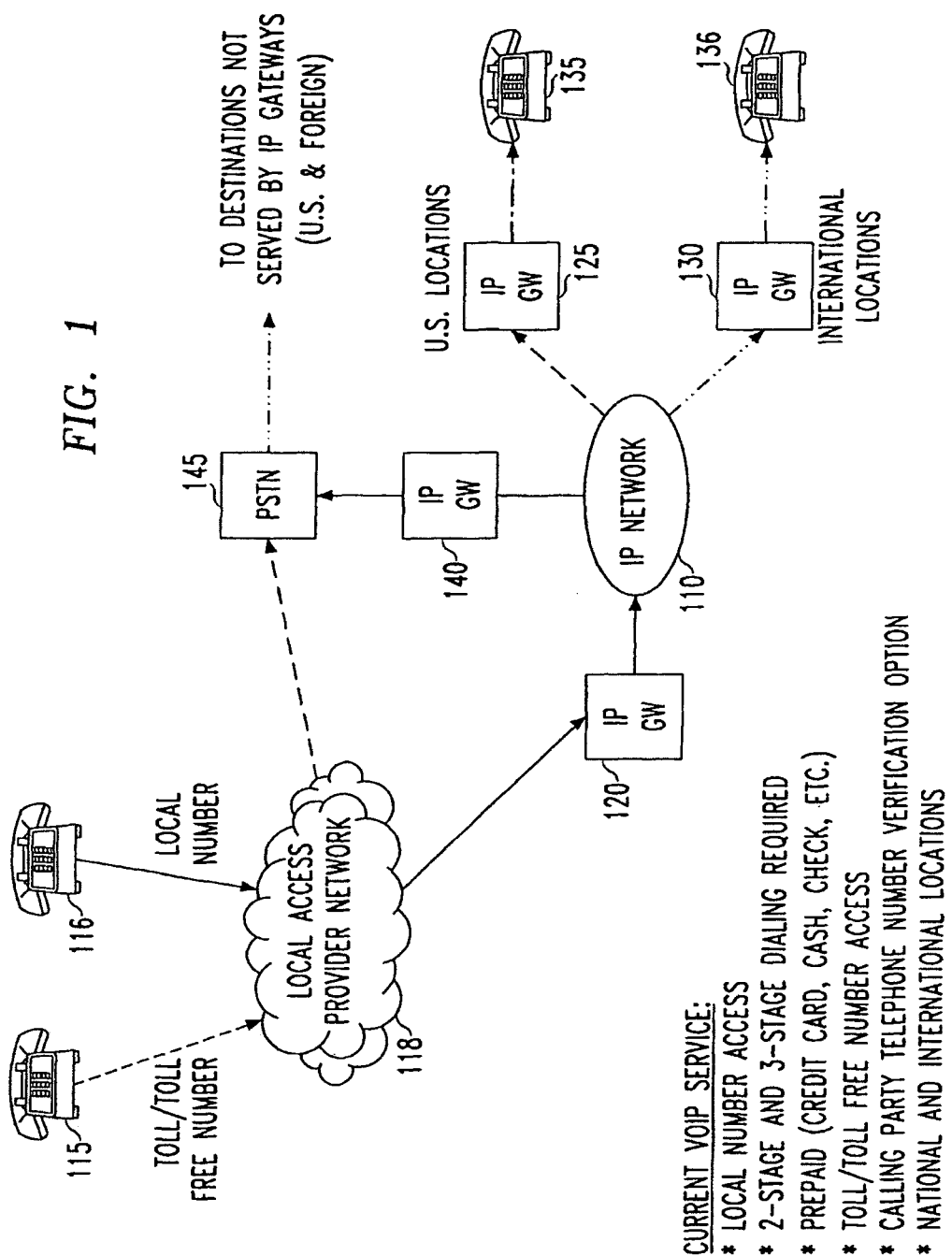
FIG. 1 is a block diagram implementation of known two-stage and three-stage voice-over-Internet protocol (VOIP) services.
Figure 3:
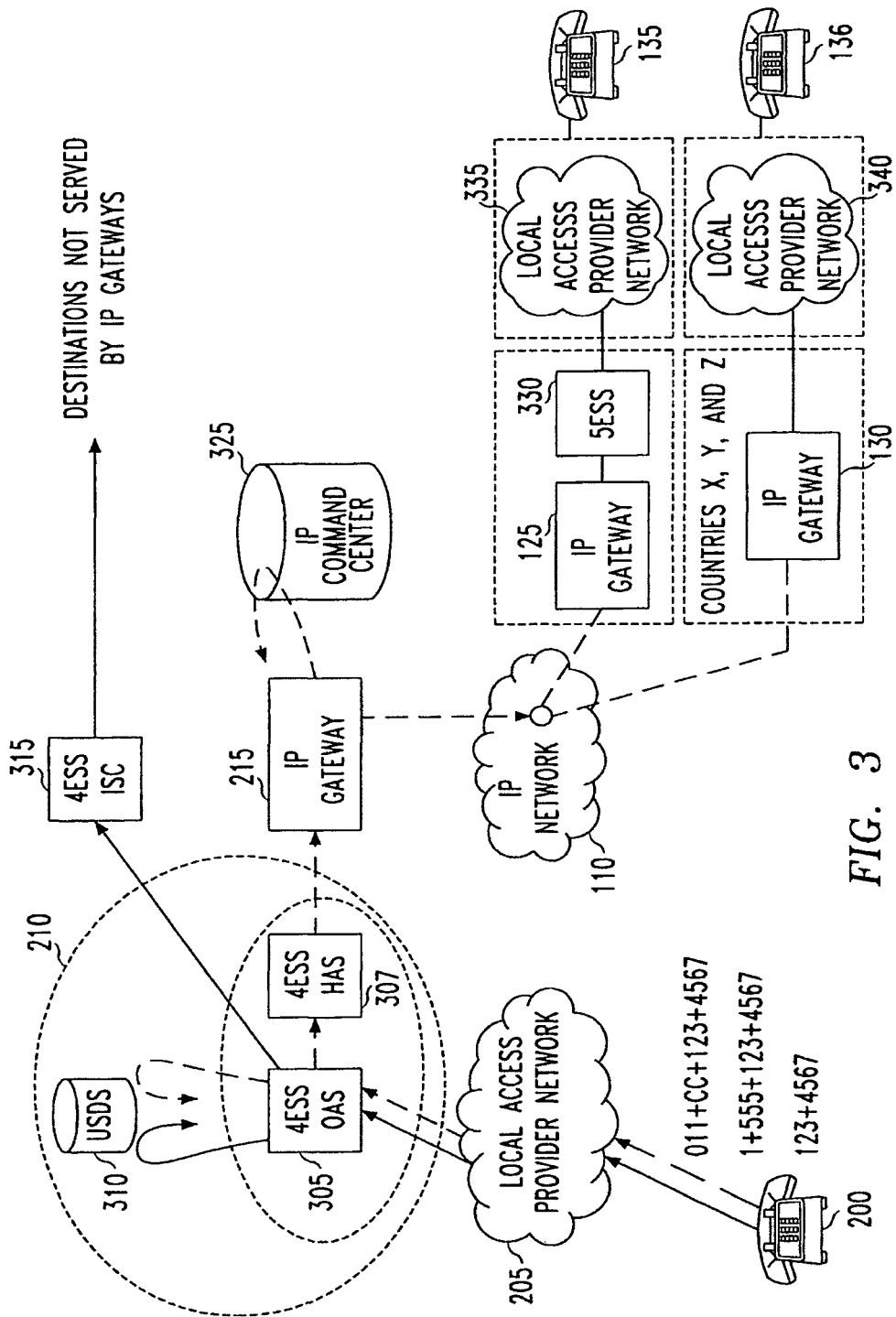
FIG. 3 is a detailed block diagram of the direct-dialed VOIP system of FIG. 2 which illustrates a direct-dialed VOIP apparatus according to an embodiment to the present invention.

FIG. 3 depicts a detailed block diagram of the direct-dialed VOIP system of FIG. 2 which illustrates a direct-dialed VOIP apparatus according to an embodiment to the present invention. In FIG. 3, elements that are common with FIG. 1 and FIG. 2 maintain their prior numbering schemes. In FIG. 3, telephone 200 is communicatively linked to the originating local-access-provider network 205, which in turn is communicatively linked to PSTN 210. In FIG. 3, in accordance with an embodiment of the present invention, PSTN 210 is shown to include a voice-band telephone switch 305, such as, for example, an Electronic Switching System Number 4 (4ESS) Originating Assist Switch (OAS), which provides the circuit-switched communication link with the originating local-access-provider network 205. The PSTN 210 also is communicatively linked to a database 310. Database 310 may be, for example which is implemented in FIG. 3 as a Universal Subscriber Data Structure (USDS), containing, but not limited to, customer telephone number information, such as, registered network service(s) for the telephone number, a country code listing of available destination IP gateways, and routing instructions. The OAS 305 receives an incoming call from telephone 200 and uses information associated with the incoming call and USDS 310 information to determine if the incoming call is to be routed as a VOIP or a circuit-switched call.

The OAS 305 also may be communicatively linked to a second telephone switch 307, such as, for example, a 4ESS Handoff Assist Switch (HAS), which is used to route the calls to be routed as VOIP calls, and a third telephone switch 315, such as, for example, a 4ESS International Switching Center (ISC), which is used to route the calls to be routed as circuit-switched calls. In accordance with an embodiment of the present invention, the HAS 307 is communicatively linked to the originating IP gateway 215, which is, in turn, linked to an IP command center database 325, which contains a listing of the specific IP gateways or complex of gateways that serve the destination number. The IP gateway 215 uses the specific IP gateway information from the IP command center database 325 to determine the final routing instruction for the call, converts the voice-band call and setup information to packets and then routes the packets to the IP network 110. In addition to the routing function, the HAS 307 may create a billing record that is used to track and record the length of the VOIP call to billed to the caller's standard telephone-bill account. The HAS 307 was used, in this embodiment of the present invention, to consolidate and reduce the number of IP gateways 215 and the number of connections that are actually made to the IP gateway 215 since the IP gateway 215 can only handle a limited number of connections. For example, in the experimental design, the IP gateway 215 could only receive a single T-1 (Trunk Level 1) connection. In accordance with an embodiment of the present invention, the system is configured with 6 IP gateways 215 and each IP gateway 215 can receive four (4) separate T-1 lines.

In an alternate embodiment of the present invention, an HAS is not used and an OAS is directly and communicatively linked to an IP gateway and the OAS also is modified to perform the functions of the HAS described above. However, in this embodiment of the present invention, the OAS can only be located a finite distance (for example, approximately 900 miles) from the IP gateway.

The ISC 315 is communicatively linked to other circuit switches, at destinations that are not served by IP gateways, to route standard circuit-switched calls.

The IP network 110 routes the packets to the appropriate destination IP gateway 125, 130 where the packets are received, reassembled and then converted back to a voice-band call. IP gateway 125 is communicatively linked to an Electronic Switching System Number 5 (5ESS) 330 and IP gateway 125 routes the reassembled voice-band call to the 5ESS 330. The 5ESS 330 routes the reassembled voice-band call to a destination local-access-provider network 335, which, in turn, routes the reassembled voice-band call to the destination telephone number 135. IP gateway 130 is directly and communicatively linked to another destination local-access-provider network 340 and IP gateway 130 routes the reassembled voice-band call to the destination local-access-provider network 340. The other destination local-access-provider network routes the reassembled voice-band call to the destination telephone number 136.

In accordance with an embodiment of the present invention, an emergency backup network is associated with the direct-dialed VOIP service and is configured to operate when, the destination IP gateway 125 or 130 goes down, that is, becomes unavailable, after the direct-dialed call has been routed to the originating IP gateway 215. In this embodiment of the present invention, if, after the direct-dialed call has been routed to the originating IP gateway 215, the destination IP gateway 125 or 130 goes down, the service automatically routes the direct-dialed call to another IP gateway in the IP network 110 and then uses the Connect 'N Save® service to complete the call. The other IP gateway can be located anywhere in the IP network 110. In an embodiment of the present, preference is first given to the other IP gateway that is located the nearest to the destination IP gateway 125 or 130. If the nearest IP gateway is also unavailable, then the call is routed through an IP gateway, which serves as the main IP gateway for the Connect 'N Save® service, to a 4ESS switch that, then, forwards the call to the ESS ISC 315 for completion as a circuit-switched call.

In FIG. 3, when a called party at a destination telephone number transmits a voice-band response back to the calling party, the above process is reversed and the transmitted voice-band response is routed through the local-access-provider network 335 or 340 and then to the appropriate IP gateway 125 or 130 where the voice-band response is converted to packets and routed over the IP network 110 to the originating IP gateway 215. When the IP gateway 215 receives all of the packets from the voice-band response, the IP gateway 215 reassembles the packets in the correct order; converts the packets back to a voice-band response and, then, routes the reassembled voice-band response to the PSTN 210 for routing through the local-access-provider network 205 to the calling party at telephone number 200.

Figure 4:
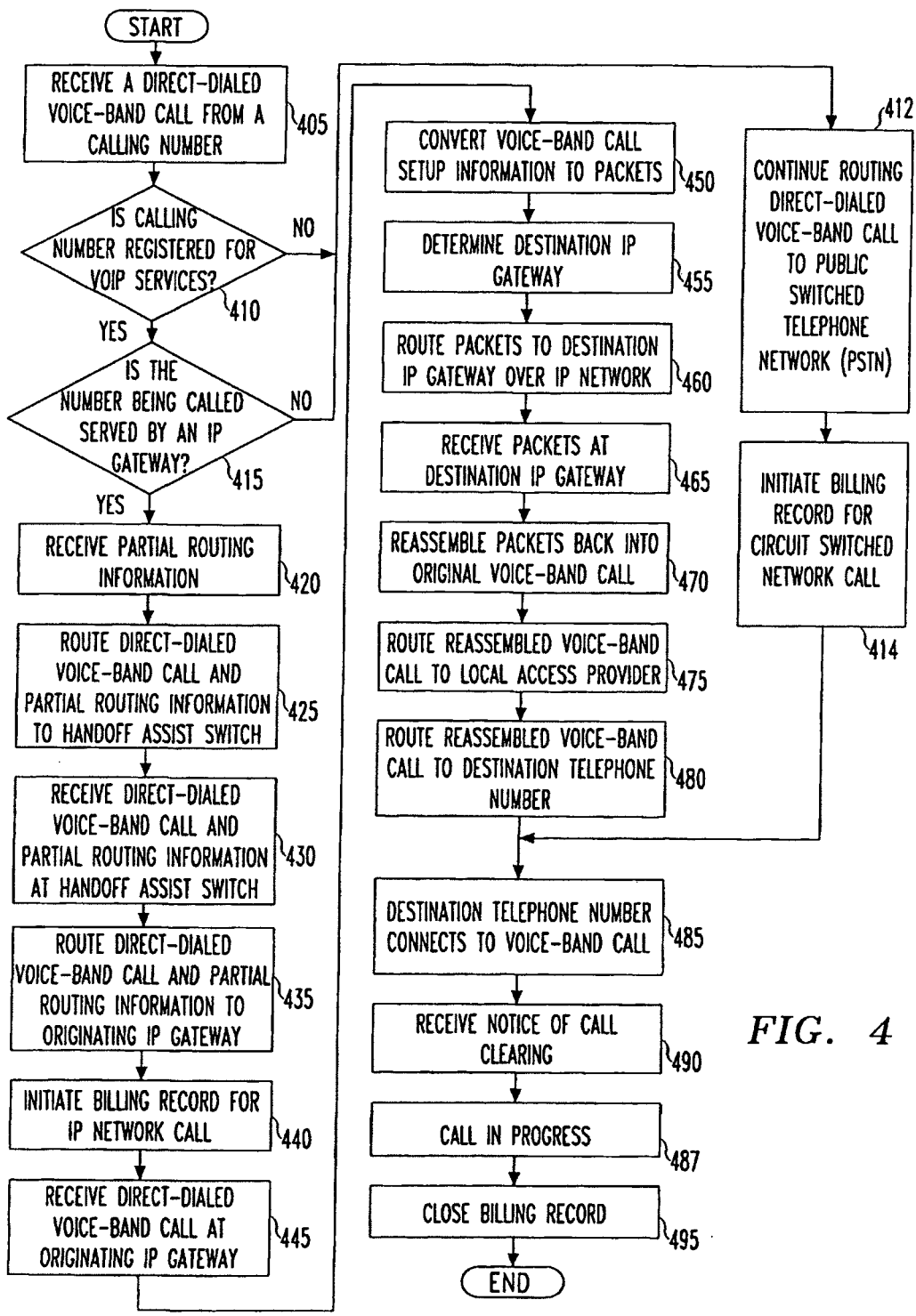
FIG. 4 is a detailed functional flow diagram of the operation of the entire direct-dialed VOIP network system of FIG. 3, in accordance with an embodiment to the present invention.

FIG. 4 depicts a detailed functional flow diagram of the operation of the entire direct-dialed VOIP network system of FIG. 3, in accordance with an embodiment to the present invention. In FIG. 4, in block 405 a direct-dialed voice-band call is received by the OAS 305 from the calling party's telephone number, where the direct-dialed voice-band call is associated with a destination telephone number. In block 410, a test is performed to determine if the calling party's telephone number was registered for the VOIP service. In an embodiment of the present invention, before the test can be performed, the OAS 305 sends the calling party's telephone number and the associated destination telephone number to the USDS 310. After receiving these numbers, the USDS 310 does a lookup in a database using the calling party's telephone number to determine if the calling party's telephone number has been registered for the VOIP service. If the calling party's telephone number was not registered for the VOIP service, then, the USDS 310 sets a terminating address value to indicate whichever service the calling party is registered, for example, "PSTN", or to a system determined default value if the calling party was not registered for any network services. The USDS 310, then, returns the terminating address to the OAS 305 where the OAS 305 determines that the terminating address value indicates the voice-band call is to be routed as a circuit-switched network call and, then, in block 412, the OAS 305 routes the direct-dialed voice-band call to the ESS ISC 315 to continue routing the direct-dialed voice-band call as a circuit-switched call through the PSTN. In block 414, a standard circuit-switched billing record is initiated. If the calling party's telephone number was registered for the VOIP service, then, in block 415, a test is performed to determine if the destination number of the voice-band call is served by an IP gateway. If the destination number of the voice-band call is not served by an IP gateway, then, in block 412, the voice-band call is routed as a circuit-switched network call and, in block 414, a standard circuit-switched billing record is initiated.

If the calling party's telephone number was registered for the VOIP service, then, the USDS 310 then checks the destination telephone number against an allowable number to determine if the destination telephone is served by an IP gateway. If the destination telephone number is not served by an IP gateway, the USDS 310 sets the terminating address to indicate a non-VOIP service, for example, "PSTN", and then returns to the OAS 305 the terminating address. The OAS 305, then, determines that the terminating address value indicates the voice-band call is to be routed as a circuit-switched network call and, then, routes the voice-band call as described above for block 412. If the destination telephone number is served by an IP gateway, then, the USDS 310 returns to the OAS 305 the terminating address value called an adjunct logical address (ALA) indicating a partial routing instruction to reach the VOIP network. In block 420, the OAS 305 receives the ALA partial routing instruction. Then, in block 425, the OAS 305 routes the voice-band call and partial routing information to the HAS 307. In block 430, the HAS 307 receives the direct-dialed voice-band call and partial routing information. The HAS 307 determines through which circuits to send the direct-dialed voice-band call by looking up in a routing table, which is kept in a memory in the HAS 307, a routing data block (RDB) is associated with an adjunct logical address (ALA) from the partial routing information. Then, in block 435, the HAS 307 routes the direct-dialed voice-band call to the originating IP gateway 215. Then, in block 440, the HAS 307 performs a call detail recording function and initiates the VOIP billing record, for example, creates a call detail record to track the direct-dialed voice-band call and to be added to a telephone-bill associated with the calling party's telephone number. As part of this call detail record, the HAS 307 adds a special module including the terminating access identification (ID) field, which is based on information provisioned on the trunk (circuit) groups so that the IP network use is explicitly indicated for both billing and tracking use. The HAS 307 then releases the call detail record to the standard telephone network billing system. In block 445, the direct-dialed voice-band call is received by the originating IP gateway 215. In block 450, the direct-dialed voice-band call setup is converted to packets. In block 455, the partial routing information is used by the originating IP gateway to determine the specific routing information for the destination IP gateway. In block 460, the packets are routed to the destination IP gateway over the IP network 110.

In block 465, the packets are received at the destination IP gateway, for example, IP gateway 130, and, then in block 470, the packets are reassembled in their correct order and converted to a reassembled voice-band call. In block 475, the reassembled voice-band call is routed to the local-access-provider network 340. In block 480, the local-access-provider network 340 receives the reassembled voice-band call and routes the reassembled voice-band call to the destination telephone number 136. In block 485, the reassembled voice-band call is received, connected to and conducted by the destination telephone number. Then, in block 487, the VOIP call is in progress with transmissions going back and forth between the calling party's telephone number and the destination telephone number. In block 490, the HAS 307 receives a notice of call clearing after the VOIP call is completed, which can be signaled when one or both of the calling party and called party disconnect from the VOIP call or some portion of the network drops the VOIP call. In block 495, the telephone billing system also receives notice of the call clearing and closes the call detail record.

For the VOIP service to operate each customer desiring to place VOIP calls must register/sign-up for the VOIP service and have the system store a VOIP service registration record for the calling party prior to the calling party placing a direct-dialed voice-band call. However, this sign-up process is only done once, just as with other calling plans. Similarly, another preliminary activity involves storing an allowable destination number list, which identifies numbers accessible using the VOIP service, prior to the calling party placing the direct-dialed telephone call.

While the above detailed description of the method of operation of the VOIP network system has been described in reference to the embodiment illustrated in FIG. 3, it is not intended to limit the scope of the invention as other embodiments are contemplated in accordance with the present invention.

Figure 5:
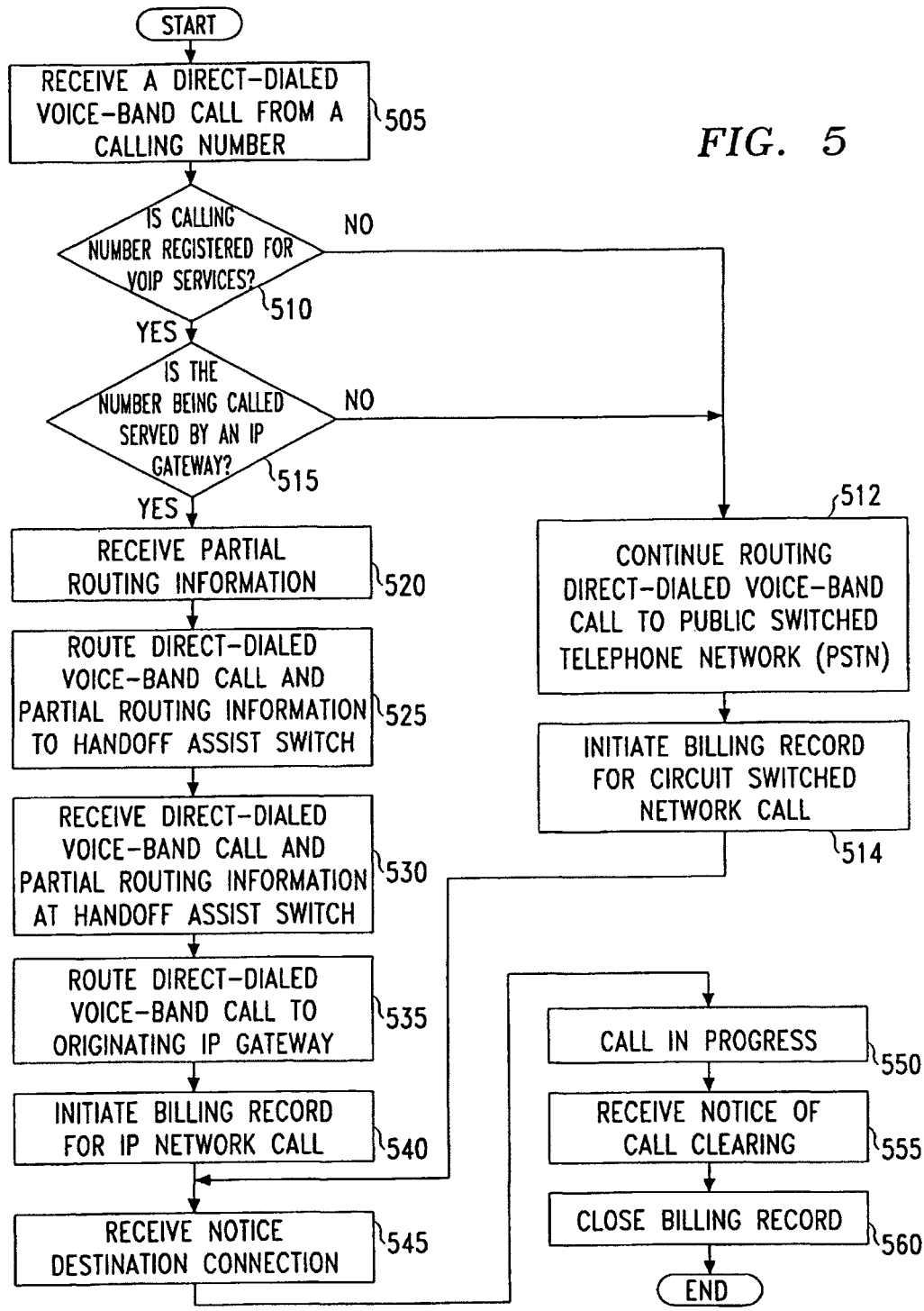
FIG. 5 is a detailed functional flow diagram of the operation detailed in FIG. 4 for the direct-dialed VOIP apparatus of the entire direct-dialed VOIP network system of FIG. 3 according to an embodiment to the present invention.

FIG. 5 depicts a detailed functional flow diagram of the operation detailed in FIG. 4 for the direct-dialed VOIP apparatus of the entire direct-dialed VOIP network system of FIG. 3 according to an embodiment to the present invention.

In FIG. 5, in block 505 a direct-dialed voice-band call is received by the OAS 305 from the calling party's telephone number, where the direct-dialed voice-band call is associated with a destination phone number. In block 510, a test is performed using the USDS 310 to determine if the calling party's telephone number was registered for the VOIP service. If the calling party's telephone number was not registered for the VOIP service, then, in block 512, the voice-band call is routed as a circuit-switched network call and, in block 514, a standard circuit-switched billing record is initiated. If the calling party's telephone number was registered for the VOIP service, then, in block 515, a test is performed using the USDS 310 to determine if the destination number of the voice-band call is served by an IP gateway. If the destination number of the voice-band call is not served by an IP gateway, then, in block 512, the voice-band call is routed as a circuit-switched network call and, in block 514, a standard circuit-switched billing record is initiated. If the calling party's telephone number was registered for the VOIP service, then, in block 520 partial routing information is received by the OAS 305 and, in block 525, the direct-dialed voice-band call and partial routing information are routed to the HAS 307 from the OAS 305. In block 530, the direct-dialed voice-band call and partial routing information are received by the HAS 307. In block 535, the direct-dialed voice-band call is routed to the originating IP gateway 215 by the HAS 307. In block 540, the HAS 307 initiates an IP billing record by creating a call detail record to track the direct-dialed voice-band call and be added to a telephone-bill associated with the calling party's telephone number. In block 545, the HAS 307 receives notice of the destination telephone number connecting to the direct-dialed voice-band call. Then, in block 550, the VOIP call is in progress with transmissions going back and forth between the calling party's telephone number and the destination telephone number. In block 555, the HAS 307 receives a notice of call clearing after the VOIP call is completed, which can be signaled when one or both of the calling party and called party disconnect from the VOIP call or some portion of the network drops the VOIP call. In block 560, the telephone billing system also receives notice of the call clearing and closes the call detail record.

While the above detailed description of the method of operation of the VOIP apparatus has been described in reference to the embodiment illustrated in FIG. 3, it is not intended to limit the scope of the invention as other embodiments are contemplated in accordance with the present invention.

Figure 6:
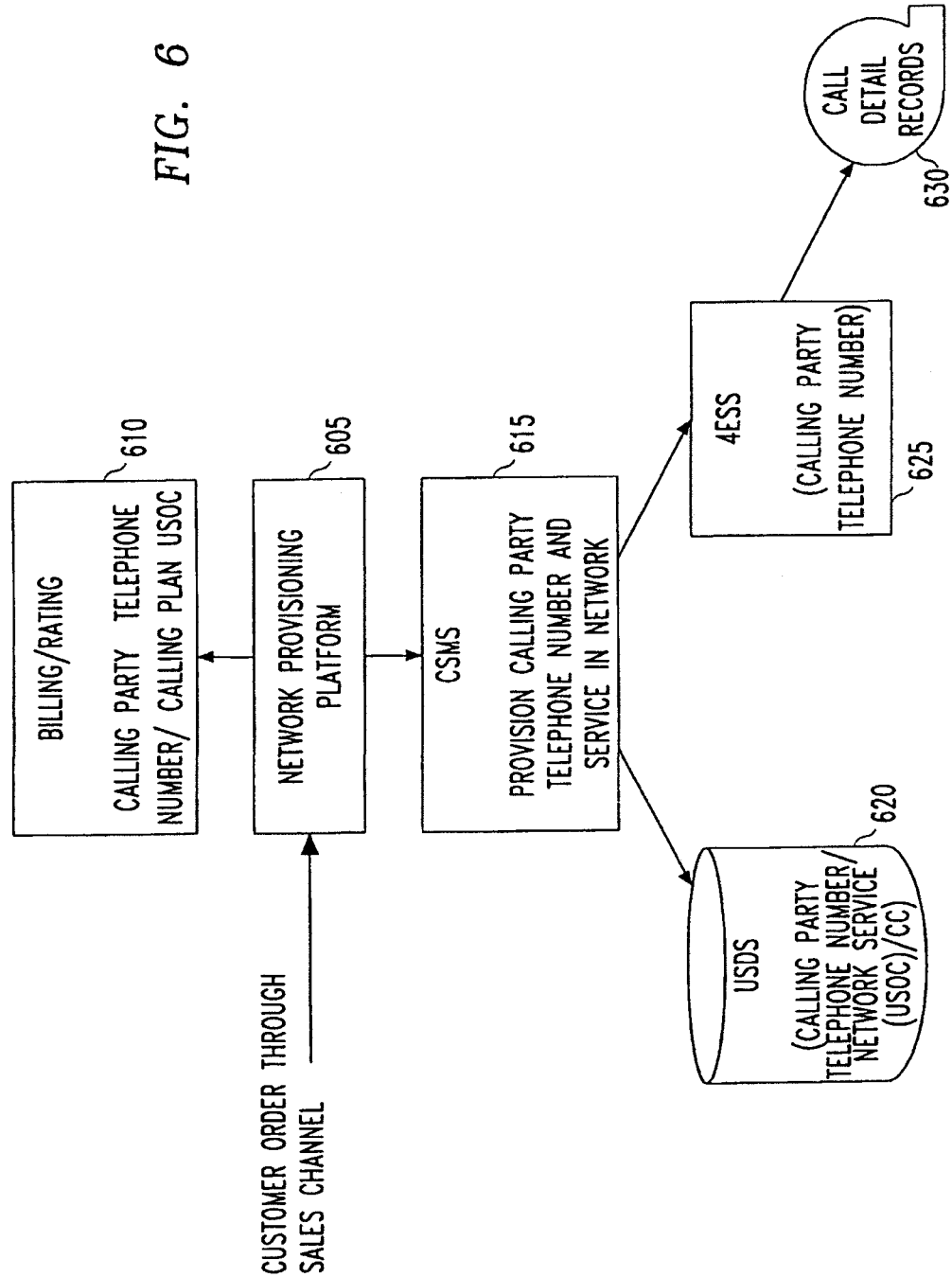
FIG. 6 is a detailed block diagram of an offline provisioning system which is necessary for the proper operation of the direct-dialed VOIP service according to an embodiment to the present invention.

FIG. 6 depicts a detailed block diagram of an offline provisioning system that can be configured to operate with the direct-dialed VOIP service, in accordance with an embodiment to the present invention. In FIG. 6, a network provisioning platform (NPP) 605, which is configured to receive a customer order for the VOIP service and keep the network and the billing systems synchronized, is communicatively linked to a billing system 610, which is configured to maintain customer account information and the VOIP calling plan. The NPP 605 is also communicatively linked to a Customer Service Message System (CSMS) 615, which is configured to provision customer calling number and service in the VOIP network. The CSMS 615 is also communicatively linked to a Universal Subscriber Data Structure (USDS) database 620 and a 4ESS telecommunications switch 625. The 4ESS 625 is communicatively linked to a data record system 630, which is configured to store call detail records for completed VOIP calls with a terminating access ID equal to "IP".

Specifically, in FIG. 6, the NPP 605 is configured to receive a VOIP service registration/order for the calling party's telephone number, generate a billing system order and a network service order for the calling party's telephone number VOIP service and, then, forward the orders to the billing system 610 and the CSMS 615, respectively. The NPP 605 is also configured to manage the interaction between a calling party telephone number and a billed telephone number, to provide updated records to the billing system 610 and the CSMS 615 to compensate for numbering plan changes. The NPP 605 is further configured to synchronize any other changes due to calling party activations, disconnections and/or changes in the billing system 610 and the CSMS 615.

The billing system 610 is further configured to maintain calling party telephone number account information, to maintain a rating table with applicable PSTN and VOIP rates, and to create bills using the rating table, use records, terminating access ID and calling plan uniform service order code (USOC).

The CSMS 615 is further configured to synchronize between the 4ESS telecommunications switch 625 and the network database in the USDS 620, which stores the calling party telephone numbers that are registered for the VOIP service, USOC information and destination number information.

While the above detailed description of the offline provisioning system has been described in reference to the embodiment illustrated in FIG. 6, it is not intended to limit the scope of the invention as other embodiments are contemplated in accordance with the present invention.

Figure 7:
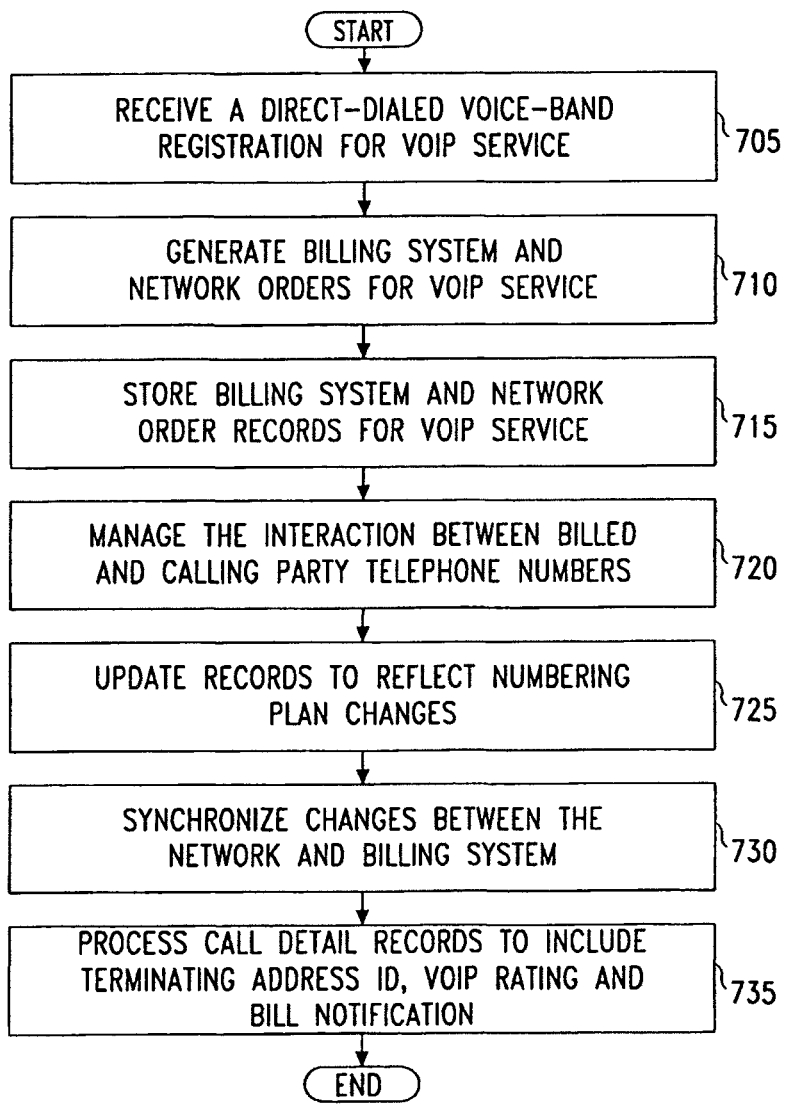
FIG. 7 is a detailed functional flow diagram of the operation of a scalable offline provisioning system in FIG. 6 according to an embodiment to the present invention.

FIG. 7 depicts a detailed functional flow diagram of the operation of a scalable offline provisioning system in FIG. 6 according to an embodiment to the present invention. The system is scalable because it can be configured to work with both small (for example, a corporate telephone network on a LAN) and large systems (for example, the national and international system illustrated in FIG. 3). In FIG. 7, in block 705, the NPP 605 receives a VOIP service registration/order for a calling party telephone number and, then in block 710, the NPP 605 generates a billing system order and a network service order for the calling party telephone number's VOIP service. In block 715, the NPP 605 forwards the billing system order to the billing system 610 to be stored and the network system order to the CSMS 615 to be stored. In block 720, the NPP 605 manages the billing interaction for a billed account between at least one calling party telephone number and a billed telephone number when a call is placed from the calling party telephone number. That is, the NPP 605 ensures that the call detail record generated for each call is billed to the correct telephone number after the call is terminated. In general, the calling party telephone number and the billed telephone number are the same number, however, these numbers can also be different numbers. In block 725, the NPP 605 provides updated records to the billing system 610 and the CSMS 615 to reflect numbering plan changes. In block 730, the NPP 605 synchronizes the changes between the billing system 610 and the CSMS 615 due to, for example, calling party activations, disconnections and other changes. In block 735, the billing system 610 processes the call detail records from completed calls, where the call detail records include information on the terminating access ID, VOIP rating and bill notification.

The CSMS 615 is further configured to synchronize between the telecommunication switch 625 and the network database in the USDS 620, which stores the calling party telephone numbers that are registered for the VOIP service, network service information (for example, USOC information) and destination number information.

While the above detailed description of the method of operation of the offline provisioning system has been described in reference to the embodiment illustrated in FIG. 6, it is not intended to limit the scope of the invention as other embodiments are contemplated in accordance with the present invention. For example, embodiments of the present can be implemented to handle intra-state, inter-state and international voice-band calls (for example, regular telephone calls, facsimile transmissions and modem initiated calls) using standard circuit-switched telephone lines, cable, twisted pair, digital subscriber line (DSL) and wireless. Similarly, in an embodiment of the present invention, the customer can register for the VOIP service by selecting both a provider, that is a Primary Interexchange Carrier (PIC) and a calling plan. Alternatively, in another embodiment of the present invention, the customer can register for the VOIP service by only selecting a PIC, for example, if the PIC does not need to have a calling plan associated with the PIC in order to provide the VOIP service. The select the PIC only embodiment could be used, for example, for a provider that only provides the VOIP service.

In an embodiment of the present invention, a method for routing direct-dialed voice-band calls over an IP network includes receiving a direct-dialed voice-band call from a calling party telephone number, the direct-dialed voice-band call being associated with a destination number. The method further includes automatically routing the direct-dialed voice-band call to the destination number as a VOIP telephone call if the calling party telephone number is registered for a VOIP service and if the destination number of the direct-dialed telephone call is accessible by the VOIP service.

In an embodiment of the present invention, a method for automatically provisioning and maintaining a network system for routing direct-dialed voice-band calls from a calling party telephone number over an IP network includes receiving a VOIP service registration for the calling party telephone number, generating at least one order record for the calling party telephone number's VOIP service and storing the at least one order record for the calling party telephone number's VOIP service. The method further includes managing the billing interaction for a billed account between at least one calling party telephone number and a billed telephone number; synchronizing changes made to the stored at least one order record for the calling party telephone number's VOIP service, between the network system and a billing system, due to calling party activations, disconnections and changes; and processing at least one call detail record including at least a terminating access identification (ID).

In an embodiment of the present invention, an apparatus includes a first voice-band switch and a database coupled to the first voice-band switch. In the apparatus, the first voice-band switch is configured to receive a direct-dialed voice-band call from a calling party's telephone number and to automatically designate the direct-dialed voice-band call as a VOIP call.

In an embodiment of the present invention, an apparatus includes an ESS OAS, with the OAS being configured to receive a direct-dialed voice-band call from a calling party's telephone number, the direct-dialed voice-band call being associated with a destination telephone number. The OAS is further configured to determine whether to route the direct-dialed voice-band call over an IP network or a circuit-switched network and, if it is determined to route the direct-dialed voice-band call over the IP network, the OAS is configured to transmit the direct-dialed voice-band call to the IP network, or, if it is determined to continue to route the direct-dialed voice-band call over the circuit-switched network, the OAS is configured to transmit the direct-dialed voice-band call to the circuit-switched network. The apparatus further includes an USDS coupled to the ESS OAS, with the USDS being configured to store information on a plurality of calling party's telephone numbers registered for the VOIP service, to store information on which destination telephone numbers are accessible using the VOIP service, to receive the calling party's telephone number and a destination telephone number of the direct-dialed voice-hand call from the OAS, to determine if the calling party's telephone number is registered for the VOIP service, and, if the calling party's telephone number is registered for the VOIP service, to determine if the destination telephone number is accessible using the VOIP service, and to return a partial routing instruction and service information to the OAS.

In an embodiment of the present invention, a system for automatically provisioning and maintaining a network system for routing direct-dialed voice-band calls from a calling party telephone number over an IP network includes a network provisioning component. The network provisioning component is configured to receive a VOIP service registration for the calling party telephone number, to generate at least one order record for the calling party telephone number's VOIP service, to store the at least one order record for the calling party telephone number's VOIP service, to manage the billing interaction for a billed account between at least one calling party telephone number and a billed telephone number, and to update the at least one order record to compensate for numbering plan changes. The system further includes a billing system component coupled to the network provisioning component, and the billing system component is configured to maintain at least one calling party's account information, to maintain the VOIP service, to create bills based on usage, terminating access ID and calling plan USOC. The system further includes a CSMS component, which is coupled to the network provisioning component. The CSMS component is configured to synchronize changes made to the stored at least one order record for the calling party telephone number's VOIP service, between at least one telecommunications switch and a database, which stores calling party telephone numbers that are registered for the VOIP service, USOC information and destination number information. The network provisioning component is further configured to synchronize changes made to the stored at least one order record for the calling party telephone number's VOIP service, between the network system and a billing system, due to calling party activations, disconnections and changes.

In the foregoing detailed description and figures, several embodiments of the present invention are specifically illustrated and described. Accordingly, it will be appreciated that modifications and variations of the present invention are covered by the above teachings and within the purview of the appended claims without departing from the spirit and intended scope of the invention.

What is claimed is:

1. A method for routing a direct-dialed voice-band call, comprising:
   receiving, by a routing component, the direct-dialed voice-band call from a calling party telephone number associated with a telephone in communication with a circuit-switched public switched telephone network, the direct-dialed voice-band call being associated with a destination number;
   determining, by the routing component, the destination number is served by an internet protocol gateway by searching a database in communication with an internet protocol gateway serving the calling party telephone number;
   routing, by the routing component, the direct-dialed voice-band call to the destination number that is served by the internet protocol gateway as a voice-over-Internet protocol telephone call, via a direct link from a local access provider network to an internet protocol gateway that bypasses the public switched telephone network located between the local access provider network and the internet protocol gateway, where the calling party telephone number is registered for a voice-over-internet protocol service and where the destination number of the direct-dialed telephone call is accessible by the voice-over-internet protocol service; and
   initiating, by the routing component, a voice-over-internet protocol billing record to be generated for the direct-dialed voice-band call.

2. The method of claim 1, further comprising:
   receiving a registration for the calling party telephone number for the voice-over-internet protocol service prior to the calling party placing the direct-dialed telephone call.

3. The method of claim 2, further comprising:
   storing a voice-over-internet protocol service registration record for the calling party telephone number.

4. The method of claim 2, further comprising:
   storing an allowable destination list, which identifies the destination numbers accessible using the voice-over-internet protocol service, prior to the calling party placing the direct-dialed telephone call.

5. The method of claim 1, wherein the routing the direct-dialed voice-band call to the destination number as a voice-over-Internet protocol telephone call when the calling party telephone number is registered for a voice-over-internet protocol service and the destination number of the direct-dialed telephone call is accessible by the voice-over-internet protocol service comprises:
   determining a voice-over-internet protocol service registration record for the calling party telephone number exists; and
   determining whether the destination number of the direct-dialed voice-band call is accessible by the voice-over-internet protocol service.

6. The method of claim 5, further comprising:
   when the calling party telephone number is registered for the voice-over-internet protocol service and when the destination number of the direct-dialed voice-band call is accessible by the voice-over-internet protocol service, receiving an indication to route the direct-dialed voice-band call over the internet protocol network, otherwise, receiving an indication to route the direct-dialed voice-band call over the circuit-switched public switched telephone network.

7. The method of claim 6, wherein the initiating comprises initiating the billing record for the direct-dialed voice-band call when the indication is to route the direct-dialed voice-band call over the internet protocol network, wherein the billing record is associated with the calling party telephone number.

8. The method of claim 7, further comprising:
   routing the direct-dialed voice-band call to the internet protocol network.

9. The method of claim 8, further comprising:
   receiving a notice of the direct-dialed voice-band call clearing.

10. The method of claim 9, further comprising:
    closing the billing record for the direct-dialed voice-band call.

11. A switch for performing operations comprising:
    receiving a direct-dialed voice-band call from a calling party telephone number associated with a telephone in communication with a circuit-switched public switched telephone network, the direct-dialed voice-band call being associated with a destination number;
    determining the destination number is served by an internet protocol gateway by searching a database in communication with an internet protocol gateway serving the calling party telephone number;
    routing the direct-dialed voice-band call to the destination number that is served by the internet protocol gateway as a voice-over-Internet protocol telephone call, via a direct link from a local access provider network to an internet protocol gateway that bypasses the public switched telephone network located between the local access provider network and the internet protocol gateway, where the calling party telephone number is registered for a voice-over-internet protocol service and where the destination number of the direct-dialed telephone call is accessible by the voice-over-internet protocol service; and initiating a voice-over-internet protocol billing record to be generated for the direct-dialed voice-band call.

12. The switch of claim 11, wherein the operations further comprise:

receiving a registration for the calling party telephone number for the voice-over-internet protocol service prior to the calling party placing the direct-dialed telephone call.

13. The switch of claim 12, wherein the operations further comprise:

storing a voice-over-internet protocol service registration record for the calling party telephone number.

14. The switch of claim 12, wherein the operations further comprise:

storing an allowable destination list, which identifies the destination numbers accessible using the voice-over-internet protocol service, prior to the calling party placing the direct-dialed telephone call.

15. The switch of claim 11, wherein the operations further comprise:

when the calling party telephone number is registered for the voice-over-internet protocol service and when the destination number of the direct-dialed voice-band call is accessible by the voice-over-internet protocol service, receiving an indication to route the direct-dialed voice-band call over the internet protocol network, otherwise, receiving an indication to route the direct-dialed voice-band call over the circuit-switched public switched telephone network.

16. The switch of claim 15, wherein the initiating comprises initiating the billing record for the direct-dialed voice-band call when the indication is to route the direct-dialed voice-band call over the internet protocol network, wherein the billing record is associated with the calling party telephone number.

17. The switch of claim 11, wherein the operations further comprise:

routing the direct-dialed voice-band call to the internet protocol network.

18. The switch of claim 17, wherein the operations further comprise:

receiving a notice of the direct-dialed voice-band call clearing.

19. The switch of claim 18, wherein the operations further comprise:

closing the billing record for the direct-dialed voice-band call.

* * * * *